United States Patent [19]

Kamschal et al.

[11] Patent Number: 5,613,758
[45] Date of Patent: Mar. 25, 1997

[54] ILLUMINATING DEVICE WITH OPTICAL CONDUCTORS FOR ESCALATORS OR MOVING WALKWAYS

[75] Inventors: Wolfgang Kamschal, Enzesfeld; Wolfgang Neszmerak, Vienna, both of Austria

[73] Assignee: Inventio AG, Hergiswil NW, Switzerland

[21] Appl. No.: 399,589

[22] Filed: Mar. 7, 1995

[30] Foreign Application Priority Data

Mar. 9, 1994 [EP] European Pat. Off. ............. 94103546

[51] Int. Cl.⁶ ..................................................... F21S 3/14
[52] U.S. Cl. ............................ 362/146; 362/32; 362/253
[58] Field of Search ................................ 362/146, 32, 253

[56] References Cited

U.S. PATENT DOCUMENTS

| | | | |
|---|---|---|---|
| 2,282,050 | 5/1942 | Handy et al. | 362/146 |
| 2,785,286 | 3/1957 | Lichtgarn | 362/146 |
| 4,394,714 | 7/1983 | Rote | 362/146 |
| 5,067,062 | 11/1991 | Rulke | 362/146 |
| 5,339,228 | 8/1994 | Baethge et al. | 362/146 |

FOREIGN PATENT DOCUMENTS

| | | |
|---|---|---|
| 8802483 | 5/1988 | Germany . |
| 3843090 | 9/1989 | Germany . |
| 4209505 | 7/1993 | Germany . |

*Primary Examiner*—Ira S. Lazarus
*Assistant Examiner*—Alfred Basichas
*Attorney, Agent, or Firm*—Greenblum & Bernstein P.L.C.

[57] ABSTRACT

Illuminating device with optical conductors for escalators or moving walkways. Passive light sources, in an escalator or moving walkway, are mounted at freely selectable illumination points, with the light sources each being connected via a respective glass fiber optical conductor, with an active light source and serve to illuminate a movable stair or pallet belt with the thus received light via a respective integrated optical system, with the active light source being easily accessible by being centrally arranged and containing a lamp, the light thereof being fed into the discrete optical conductors at the end face in the optical conductor terminal, and these optical conductors together forming a fiber-optical light transmission network from the active light source to the passive light sources and being combined at each of both sides of the movable stair belt into a respective strand-shaped optical conductor bundle with the bundles being laid into the pedestal channels via branches thereof, with passive light sources being received in light outlets of the inward balustrade sides, the pedestal plates, the outer balustrade cover strips or the inner balustrade cover strips.

12 Claims, 2 Drawing Sheets

ILLUMINATING DEVICE WITH OPTICAL CONDUCTORS FOR ESCALATORS OR MOVING WALKWAYS

CROSS REFERENCE TO RELATED APPLICATIONS

This application claims the priority of European Patent application No. 94103546.1 filed Mar. 9, 1994.

BACKGROUND OF THE INVENTION

1. Field of the Invention

The invention pertains to an illuminating device with optical conductors for escalators or moving walkways, which includes a movable stair or pallet belt and having at least one vertical balustrade arranged laterally thereof as well as a hand rail guided at the upper end thereof in a further rail, wherein light, from at least one central light source, is guided to individual illumination points along the escalator or the moving walkway, by optical conductors extending at least partially along the balustrade. Such illumination or lighting generally serves in escalators or moving walkways to increase user safety and to improve the decorative display via special light effects.

2. Discussion of the Background of the Invention and Material Information

Generally, the illuminators or lights for escalators and moving walkways are constructed in the form of elongate fluorescent lamps which are arranged below the hand rail or recessed balustrades, whereby also a degree of protection against vandalism is assured by the recessed arrangement. Such conventional illumination equipment is however not well suited for installation in escalators and moving walkways with so-called narrow profile balustrades, which because of their small volume profile, below the hand rail, look very elegant and for that reason enjoy increasing popularity. The installation of elongate large volume fluorescent lamps into the narrow balustrade profiles would result in constructional and aesthetic problems.

On the other hand, illumination devices however have become known, which also enable adequate illumination for narrow profile balustrades without impairing the optical overall impression of the particularly delicate balustrade profile or reducing its decorative effect. Such solutions consist essentially of lamps of small dimensions that are situated below the hand rail or in the balustrade pedestal. Hitherto, smaller low-voltage tubes or Halogen lamps were generally used for this purpose.

Both low-voltage tubes and Halogen lamps suffer from the disadvantage that a relatively large number of lamp units must be used, which, because of their differing service lives, leads to frequent additional service operations at the escalators or moving walkways. Halogen lamps moreover present heat problems, and require very efficient insulation, because of their relatively high heat radiation, so that no hot installation parts result, which the users of the escalators or moving walkways can come into contact therewith. Moreover, low-voltage tubes such as Halogen lamps must be so installed that they can be exchanged in a problem-free manner. The escalator step region, which is important from the safety standpoint relative to stepping thereon, also often remains only inadequately illuminated so that it becomes necessary to mount additional illumination devices in the region of the comb plate for entry or exit purposes. Later added improvements of this type impair the elegant appearance of the narrow profile balustrades and are often perceived as purely functional illuminations.

Furthermore, an escalator with a balustrade as well as a hand rail guided at the upper edge of same, in which a stationary optical conductor consisting of light-conducting fibers is mounted in a rectangular cavity underneath the hand-rail, is set forth in German Patent Publication DE 42 09 505 C1. The cavity of rectangular cross-section is closed off downwardly by a transparent plexiglass or safety glass cover. The rectangular optical conductor consists of a plurality of individual optical fibers which together conduct the light, produced by a light source and fed in at its end face, in the longitudinal direction through the optical conductor. The individual optical fibers however do not extend exactly in longitudinal direction of the optical conductor, but at an extremely acute angle thereto, so that they also impinge on the downwardly directed light exit surface of the optical conductor at this extremely acute angle.

The rectangular cross-section of the optical conductor thus reduces over the length of the optical conductor in the manner of a wedge, wherein the cross-sectional area remaining each time from a full cross-section is filled out by a counter layer. Counter layers, such as optically conducting fibers, are flexible so that the optical conductor can be laid, parallel to the endlessly circulating hand rail, stationarily in the rectangular cross-section cavity lying thereunder. The light, which is fed in by the light source at the end face, is conducted further in the optically conducting fibers until it impinges at an acute angle on the transparent plexiglass or safety glass cover which covers the optical conductor downwardly and is radiated therefrom, parallel to the balustrade wall surface, continuously into the foot region.

Since the optical conductor employed extends along the hand rail over the full length of the upper balustrade rim, the illumination achievable over the stepping path is preset or predetermined by the light conduction and in principle restricted in respect to the light intensity. It might therefore be difficult with this balustrade illumination to adequately illuminate the stepping path with respect to the elimination of danger or the decorative make-up thereof, in all cases. On the other hand, a structuring of the optical conductor, in the sense of an increase in the light yield, leads to a relatively wide build-up which is not well suited for installation into the narrow profile of narrow profile balustrades. Furthermore, the utilized optical conductor is a fiber-optical element, which by reason of its integration into the hand rail must be individually tailored for each installation. An adaptation to different forms of construction or light conditions is hardly possible so that the application of such an optical conductor is greatly restricted with respect to the flexibility and freedom of choice. Here, the invention provides a remedy.

SUMMARY OF THE INVENTION

It is the task or object of this invention to provide illumination equipment for escalators and moving walkways, which is suitable for installation in narrow profile balustrades and all other known balustrades, with the decorative make-up thereof as well as its elegant optical overall impression being reinforced by structural advantages and special lighting effects. The illumination according to the application, particularly for narrow profile balustrades, assures illumination which is close to the movable stair or pallet belt and consequently effective and suitable for use with exposure to moisture and wetness.

This task is solved by this invention via an illuminating device including optical conductors for one of escalators and moving walkways, the one of the escalators and moving walkways including one of a movable stair and pallet belt, having at least one vertical balustrade arranged laterally thereof, as well as a hand rail guided at the upper end thereof on a further rail, wherein light, from at least one central light source, is guided, to individual illumination points along the one of the escalator and moving walkway, by the optical conductors extending at least partially along the balustrade, wherein the illumination points are passive light sources, each of the passive light sources including a respective assembly device, an optical conductor holder and an integrated optical system, with the illumination points being located spatially discrete along the one of the escalator and moving walkways, each illuminating point being connected via a respective discrete glass fiber optical conductor with an optical conductor terminal of the single central light source, with the single central light source including a lamp within a housing.

In a further embodiment of the illuminating device of this invention, the lamp within the active light source is one of a pin point and an elongate light source.

In another embodiment of the illuminating device of this invention, several active light sources are provided instead of a single central active light source.

In a differing embodiment of the illuminating device of this invention, the lamp within the single active light source includes a light reflecting mirror surface for steering the light flux to the optical conductor terminal.

In yet a further embodiment of the illuminating device of this invention, the passive light sources are arranged at both sides of one of the movable stair and pallet belt and concealed below the hand rails of one of the escalators and moving walkways.

In yet another embodiment of the illuminating device of this invention, the one of the escalators and moving walkways further includes inwardly directed balustrade sides, pedestal plates, outer balustrade cover strips and light outlets, with the passive light sources being received in the light outlets of one of the inward balustrade sides, the pedestal plates and the outer balustrade cover strips, at both sides of one of the movable stair and pallet belt.

In yet a differing embodiment of the illuminating device of this invention, the one of the escalators and moving walkways further includes a movable stair belt, strand-shaped optical conductor bundles, optical conductor bundle branches, and pedestal channels, with the discrete optical conductors, between the central active light source and the passive light sources being combined at both sides of the movable stair belt each into a respective one of the strand-shaped optical conductor bundle, the bundle being guided via the branches in the pedestal channels of the corresponding balustrades.

Still another embodiment of the illuminating device of this invention, includes the use of one of colored and polarized light for the achievement of special optical effects.

In still a further embodiment of the illuminating device of this invention, the light emitted from the central active light source is a wide-band light mixture and wherein, for the spectral allocation thereof to the individual illumination points, a respective corresponding light filter, forming a light exit surface, is provided in the integrated optical systems of each of the passive light sources.

In yet an additional embodiment of the illuminating device of this invention, the light filters with the integrated optical systems of the passive light sources are flat convex condenser lenses.

Still a further embodiment of the illuminating device of this invention includes a plurality of active light sources, each of the light sources being associated with a discrete spectral range and connected via a corresponding one of the optical conductor terminals, with at least one respective discrete optical conductor being provided in the housing.

Yet another embodiment of the illuminating device of this invention further includes a filter device, located behind the active light source in the housing, for filtering out certain spectral ranges from the emitted light.

The advantages achieved by the present invention result substantially from the fact that the passive light sources are constructed as integral units, in which no heat is produced and which are operated without circuit connection and are substantially resistant to moisture and wetness.

Accordingly, there is no danger that balustrades or hand rails are excessively heated or that the persons to be transported thereon come into contact with voltage-carrying electrical equipment, such as housings or cables. In the case of external use, short-circuits due to moisture or wetness are eliminated.

Furthermore, this invention represents an adjustable and detachable construction which, even after initial installation, can be simply and rapidly adapted to changed conditions which may result from constructional rearrangements or changed lighting conditions. Illumination equipment, constructed in this manner, has a flexibility of application and freedom in structuring that could not be achieved previously by individually tailored illuminations.

Furthermore, it has been determined that the essential elements of this invention, namely the central active light source and the discrete optical conductors as well as the compact passive light sources are related to function and not to the installation and can thus be used irrespective of the constructional nature of an installation. In respect of the illumination elements and their connection, one can speak of a build-up or assembly in the manner of a kit. For that reason, the same individual parts, mass-produced in standard sizes, can always by used for the different variations of the execution of escalators and moving walkways. From this, there results the advantage of simple production as well as uncomplicated material requirements. The adaptation to individual applications takes place by way of the discrete optical conductors via the appropriate positioning of the passive light sources.

The kit-like elements making up the illumination device of this invention are also so constructed that they can be assembled and again disassembled easily in place and are of relatively low weight. The illumination device of this invention is therefore readily suitable for installation in place, where work is often difficult due to constructional or other problems.

It has also been determined to be advantageous that a very lively or sprightly image of the stair or pallet belt arises as a result of the discreet light and shadow effect of the passive light sources when these light sources are arranged at spacings of up to about 30 centimeters.

These passive light sources themselves produce neither light nor heat, but radiate the light received from the associated optical conductors onto the stair belt. Since they are consequently not subject to wear or aging they have a very long service life and require practically no maintenance. This has proved to be very advantageous in view of the number of the passive light sources used, as well as their often concealed installation in the balustrade pedestal. This contrasts with individual or several central active light sources, in which the light required for the operation of the optical conductors is produced with much heat. In the present case, however, only individual lamps are involved, which can be cooled in any suitable manner and installed at an easily accessible place, for example in the machine or maintenance room. Changing of lamps, when necessary, is therefore very simple and rapid and without having to disassemble the stair cladding for this purpose.

The invention is detailed hereinafter, via the description and drawings, with reference to an escalator with narrow profile balustrades at both sides,-wherein stair belt illumination is arranged in the balustrade pedestal. The device shown here is however also generally usable when glass-clad areal or laminar elements, for example in a bottom view, or individual constructional elements within the installation are to be illuminated in the case of escalators or moving walkways. The drawing illustrations merely illustrate stair belt illumination as example of application of this invention.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have generally been used the same reference characters to denote the same or analogous components and wherein.

DETAILED DESCRIPTION OF THE PREFERRED EMBODIMENTS

With respect to the drawings it is to be understood that only enough of the construction of the-invention and the surrounding environment in which the invention is employed have been depicted therein, in order to simplify the illustrations, as needed for those skilled in the art to readily understand the underlying principles and concepts of the invention.

Figure 1:
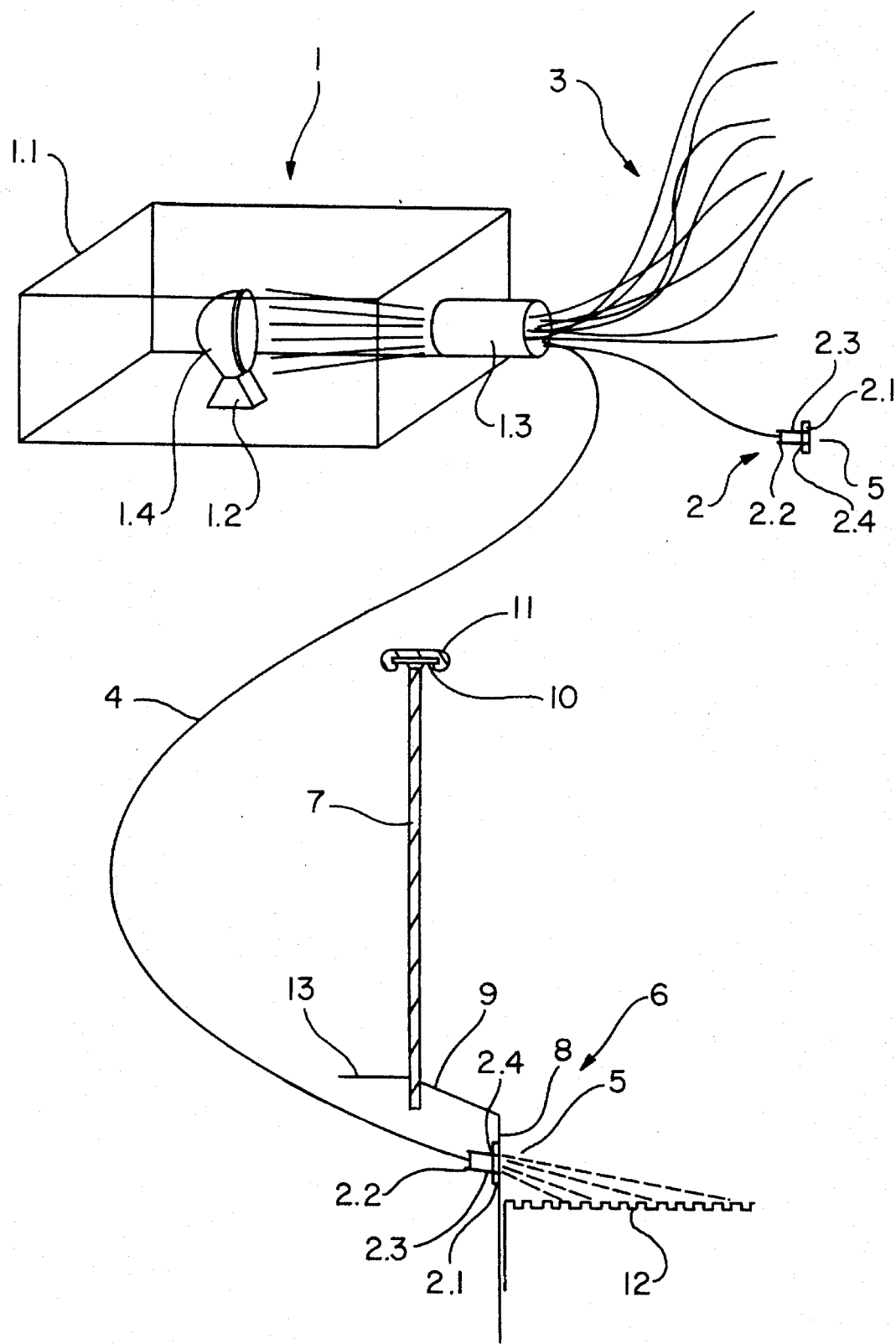
FIG. 1 is a schematic showing of the disposition and basic arrangement of the illuminating device of this invention for the illumination of a stair step from the balustrade pedestal.

FIG. 1 schematically illustrates the individual components as well as the build-up or arrangement of the illuminating device of this invention, which device in the illustrated embodiment consists essentially of an active light source 1, a plurality of passive light sources 2, as well as a fiber-optical light transmission network 3 connected therebetween.

Active light source 1 is preferably installed at a central point of the escalator installation and its housing 1.1 contains a lamp 1.2, which produces a high intensity light that is fed via optical conductor terminal 1.3 into discrete optical conductors 4 of the fiber-optical light transmission network 3. Lamp 1.2, for example, takes the form of a suitable fluorescent tube (elongated) or a Halogen lamp (pin-point) which can be backed by a light-reflecting mirror surface 1.4 to increase the light yield thereof. In addition, suitable cooling means are provided because of the high heat output associated with the light production. The fiber-optical light transmission network 3 provides the optical connection from active light source 1 to the individual illumination points 5 in the escalator or moving walkway 6. For this purpose, each discrete optical conductor 9 is connected at one end to the common optical conductor terminal 1.3 of active light source 1 and at the other end with an individual passive light source 2 associated therewith in illumination point 5. Thus, only two terminals are provided for each optical conductor 4, thereby assuring the high reliability of light transmission network 3. Discrete optical conductors 4 thus transmit the light, which is produced by active light source 1 and fed in at their end faces, substantially in their longitudinal directions, to passive light sources 2, where it is radiated for the illumination of escalator or walkway 6. Each passive light source 2 includes a respective assembly device 2.1, by which they can be installed at suitable illumination points 5 of escalator 6, namely in the pedestal plate 8-of the balustrade 7, in the manner illustrated in the embodiment of FIG. 1. The connection of optical conductors 4, at the inputs of the passive light sources 2, is always accomplished by means of an optical conductor holder 2.2 and a respective integrated optical system 2.3 is provided at the outputs or outlets for the radiation of the received light. Optical conductor holder 2.2 with its connected optical conductor 4, as well as integrated optical system 2.3, contain no potential-carrying or heat-producing parts so that passive light sources 2 as well as optical conductors 4, feeding the light thereto, are readily usable outdoors in wetness and moisture.

The function of the illuminating device according to its application is readily evident from the interconnection of its elements. In the FIG. 1 embodiment, for example, the light produced in active light source 1 is transmitted by way of discrete optical conductors 4 to passive light sources 2, in the pedestal plate 8, or to below the flexible hand rail 11, which is supported on balustrade 7 by means of a cover profile 9 and a guide rail 10, and radiated therefrom by means of integrated optical system 2.3 to a foot region of balustrade 7, to an outer cover profile 13, or in the direction of a step-shaped platform 12.

Figure 2:
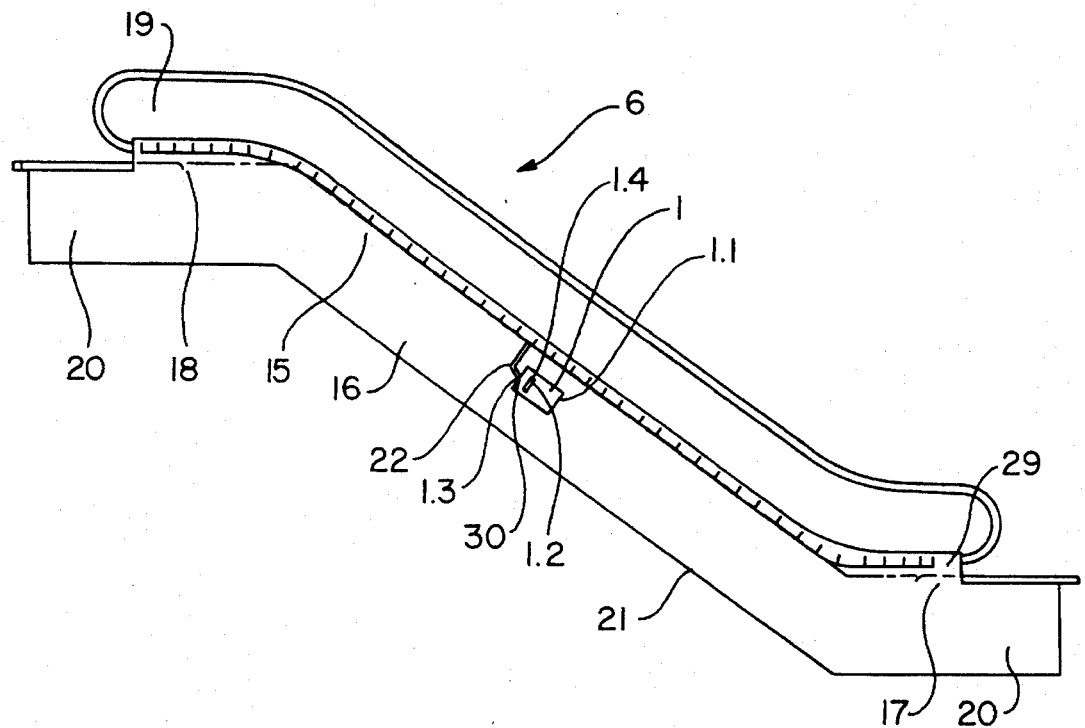
FIG. 2 is a partial vertical section of an escalator with narrow profile balustrades.
Figure 3:
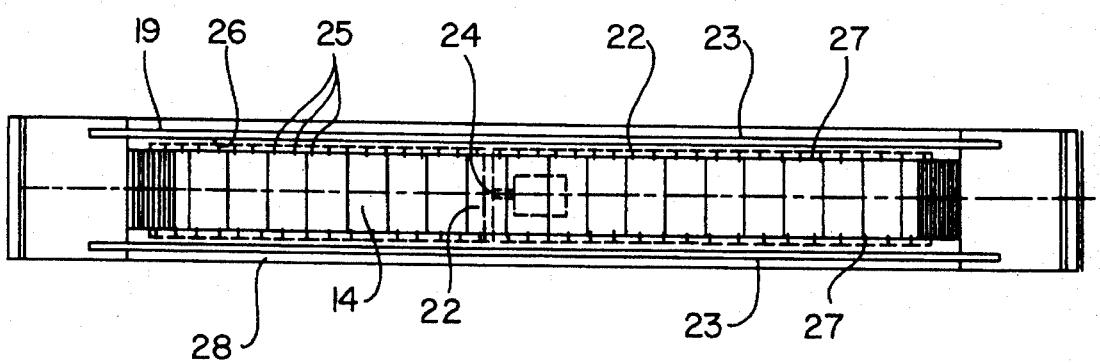
FIG. 3 is a top plan view of the escalator of FIG. 2 wherein the passive light sources of the illuminating device of this invention are installed in both of the balustrade pedestals for the spatially discrete illumination of the movable stair belt.

FIG. 2 shows an embodiment of the illuminating device of this invention in its use or application for the illumination of a continuous or endless escalator 6, which contains essentially a movable stair belt 14, with an upper load-carrying travel path 15, a lower return path 16 and a turning portion 17 at the lower stair end, as well as a turning portion 18 at the upper stair end. The movable stair belt 14 consists of a plurality of step-shaped platforms 12, which are connected in an articulate manner to each other at both of their sides into an endless loop, with platforms 12 running in guide rails and being driven by an upper sprocket wheel powered by a non-illustrated motor-driven main shaft. Furthermore, escalator 6 is constructed and driven in a manner familiar to one skilled in the escalator technology art.

However, in the case of endless escalator 6, as per FIG. 2, balustrades 19 located at both sides of movable stair belt 14, are constructed as narrow profile balustrades 7, which can be transparent, for example being assembled from synthetic or plastic material or of clear glass panes. Due to their particularly narrow profile and also due to the elegant optical overall impression, the balustrades are not suitable for the installation of conventional lamps of large size or volume. Correspondingly, flexible hand rail 11, which is supported on balustrade 19, bounded by cover profile 9, by means of a guide rail 10, is also of a narrow profile and the cavity lying thereunder is also of too small a volume for the accommodation of conventional lamps therein. As can be recognized from FIG. 2, the illuminating device of the present example contains an active light source 1, which is normally provided with suitable cooling and in which any desired lamp 1.2 of sufficiently high light intensity can be used. Since elevated temperature and thereby reduced service life of the components must be reckoned with in spite of the usual cooling, active light source 1 is mounted so as to be easily accessible, for example within the escalator 6, between upper load-carrying travel section 15 and return section 16, so that a replacement of lamp 1.2, upon failure or for the purpose of precautionary maintenance, is readily possible and can be accomplished rapidly without having to remove either the escalator cladding 20 or the underneath view or bottom cladding 21.

For the operation of the illuminating device in accordance with the invention, the light produced by active light source 1 must be transmitted to passive light sources 2 mounted at suitable illumination points 5 in the escalator installation. Fiber-optical light transmission network 3, consisting of the discrete optical conductors 4, serves this purpose. These optical conductors 4 are combined at each of both of the sides of the movable stair belt 14 into a respective strand-shaped optical conductor bundle 22, which bundles are laid into the pedestal channels 23 and are connected with the individual passive light sources 2 by means of branches 24. In the present embodiment, the innovation is constructed as stair belt illumination in the pedestal of escalator 6. Accordingly, passive light sources 2 are mounted in light outlets 27 in pedestal plate 8 of narrow profile balustrades 7 and so oriented that the light received from optical conductors 4 is radiated onto the step-shaped platforms 12. In an alternate embodiment, passive light sources 2 can be received in light outlets 25 of inwardly directed balustrade sides 26, the inward or outward balustrade cover profiles or balustrade cover strips 28.

The use of discrete passive light sources 2 normally leads to a discontinuous and likewise discrete illumination of stair belt 14, which results in a very sprightly or lively picture of the step-shaped platforms 12 and moreover makes special lighting effects possible. On the other hand, the elements of the illuminating equipment also have small dimensions in a normal mode of construction so that, in the case of installation at a close spacing or even flush installation, the impression of a quasi-continuous illumination can readily be achieved via the discrete passive light sources.

In order to achieve special optical effects, the use of colored or polarized light is anticipated, wherein the requirements of escalator illumination are prerequisites for the light in both cases.

In place of a single central active light source 1, several active light sources can also be deployed, which via the use of colored light each cover a discrete spectral range and are associated individually or in combination with optical conductors 4 by way of corresponding optical conductor terminals 1.3.

On the other hand, illumination can also be achieved with a single wide-band active light source 1, the light of which contains at least the spectral ranges corresponding to the desired colors. The individual colors are then filtered out of the emitted light by a filter device 30, which may take the form of flat convex condenser lenses, located after active light source 1 in housing 1.1 or allocated spectrally to the individual illumination points 5 by means of color filters 2.4 which form a respective light exit surface in each of the integrated optical systems of passive light sources 2.

It should be obvious to one skilled in this art that the invention is not restricted to stair belt illumination in balustrade pedestal 29. It is generally suitable for the light-technical refurbishing of existing escalators or moving walkways, in particular those with narrow profile balustrades 7, wherein the usual large volume profile is not available below hand rail 11. As a further variation, housing 1.1, for active light source 1, can be dispensed with and, instead lamp 1.2, together with light-reflecting mirror surface 1.4, can be constructed as a part of optical conductor terminal 1.3.

While there are shown and described present preferred embodiments of the invention, it is to be distinctly understood that the invention is not limited thereto, but may be otherwise variously embodied and practiced within the scope of the following claims and the reasonably equivalent structures thereto. Further, the invention illustratively disclosed herein may be practiced in the absence of any element which is not specifically disclosed herein.

What is claimed:

1. An illuminating device including optical conductors for one of escalators and moving walkways, the one of the escalators and moving walkways including one of a movable stair and pallet belt, having at least one vertical balustrade arranged laterally thereof, as well as a hand rail guided at the upper end thereof on a further rail, wherein light from at least one central light source is guided to a plurality of individual illumination points along the one of the escalator and moving walkway through the optical conductors extending at least partially along the balustrade, wherein the plurality of individual illumination points are passive light sources, each of the passive light sources including an assembly device, an optical conductor holder and an integrated optical system, the plurality of individual illumination points being located at spatially discrete positions along the one of the escalator and moving walkways and being connected via a respective discrete glass fiber optical conductor with an optical conductor terminal of the at least one central light source, and wherein the at least one central light source including a lamp positioned within a housing.

2. The illuminating device of claim 1, wherein the lamp within the at least one central light source is one of a pin point and an elongate light source.

3. The illuminating device of claim 1, wherein at least one central light source includes a plurality of active light sources.

4. The illuminating device of claim 1, wherein the lamp within the at least one central light source includes a light reflecting mirror surface for steering light flux to the optical conductor terminal.

5. The illuminating device of claim 1, wherein the passive light sources are arranged at both sides of one of the movable stair and pallet belt and concealed below the hand rails of one of the escalators and moving walkways.

6. The illuminating device of claim 1, wherein the one of the escalators and moving walkways further includes inwardly directed balustrade sides, pedestal plates, outer balustrade cover strips and light outlets, with the passive light sources being received in the light outlets of one of the inward balustrade sides, the pedestal plates and the outer balustrade cover strips, at both sides of one of the movable stair and pallet belt.

7. The illuminating device of claim 1, wherein the one of the escalators and moving walkways further includes a movable stair belt, strand-shaped optical conductor bundles, optical conductor bundle branches, and pedestal channels, with the discrete glass fiber optical conductors, between the at least one central light source and the passive light sources being combined at both sides of the movable stair belt each into a respective one of the strand-shaped optical conductor bundle, the bundle being guided via the branches in the pedestal channels of the corresponding balustrades.

8. The illuminating device of claim 1, including one of a colored and a polarized light for the achievement of special optical effects.

9. The illuminating device of claim 8, wherein emitted light from the at least one central light source is a wide-band light mixture and wherein, for a spectral allocation thereof to said each individual illumination point, a respective corresponding light filter, forming a light exit surface, is provided in the integrated optical systems of each of the passive light sources.

10. The illuminating device of claim 9, wherein the light filters with the integrated optical systems of the passive light sources are flat convex condenser lenses.

11. The illuminating device of claim 8, further including a plurality of active light sources, each of the plurality of active light sources being associated with a discrete spectral range and connected via a corresponding one of the optical conductor terminals, with at least one respective discrete optical conductor being provided in the housing.

12. The illuminating device of claim 8, further including a filter device located in the housing for filtering out certain spectral ranges from light emitted from the at least one central light source.

* * * * *